United States Patent [19]

Kuwayama et al.

[11] Patent Number: 5,598,249
[45] Date of Patent: Jan. 28, 1997

[54] DX CODE SENSING NEGATIVE FILM CARRIER

[75] Inventors: Masahiko Kuwayama, Urawa; Yoshihiro Yamamoto, Tokyo, both of Japan

[73] Assignee: Samsung Aerospace Industries, Ltd., Changwon, Rep. of Korea

[21] Appl. No.: 311,043

[22] Filed: Sep. 23, 1994

[30] Foreign Application Priority Data

Sep. 24, 1993 [JP] Japan .................................. 5-261640

[51] Int. Cl.$^6$ .................................................. G03B 27/52
[52] U.S. Cl. ............................................. 355/41; 355/75
[58] Field of Search ................ 355/38, 41; 250/559.44; 354/298, 334, 339; 256/443; 235/462

[56] References Cited

U.S. PATENT DOCUMENTS 5,353,096  10/1994  Frick et al. ................................. 355/41
5,448,049   9/1995  Shafer et al. ............................. 235/462

Primary Examiner—Joan H. Pendegrass
Attorney, Agent, or Firm—Morgan & Finnegan, L.L.P.

[57] ABSTRACT

A negative film carrier which restricts the lateral movement of negative film along a film path and determines the locations of sensors for detecting a DX code in order to prevent the poor detection (crosstalk) of a sensor, includes a restriction member for restricting the lateral movement of the negative film which is installed in a film path and DX code sensors, for detecting the DX code of the negative film, which are disposed within the restriction member.

6 Claims, 3 Drawing Sheets

DX CODE SENSING NEGATIVE FILM CARRIER

BACKGROUND OF THE INVENTION

The present invention relates to a negative film carrier used for a photograph printing apparatus, and more particularly, to a negative film carrier for correctly sensing the DX code of a negative film.

FIG. 1 is a schematic diagram showing the overall structure and component layout of a conventional printer for use in photograph printing. Referring to FIG. 1, in the upper portion of a printer body 1, printing paper is wound on a roll 2, and a container 12 for enclosing roll 2 is provided. A tray 18 for receiving the printing paper after being cut into pieces by a cutter 17 installed adjacent thereto is provided in the upper portion of the other side of the printer body 1. Disposed along the path of the printing paper between container 12 and tray 18 is an exposing portion 13 and a processing portion 16. The exposing portion 13 is arranged vertically and located adjacent to an optical system (described below), to thereby expose the downwardly proceeding printing paper. The processing portion 16 is provided with a multitude of transfer rollers and processing chambers, for processing and fixing the exposed printing paper. In addition, a cavity 14 where the exposed printing paper stays temporarily is provided in the lower portion of exposing portion 13.

The optical system includes, aligned along a single optical axis OA, a light source 4 for generating light that exposes the printing paper, a color filter 5 for passing a specific wavelength of light emanating from light source 4, an optical diffusion box 6 for uniformly diffusing filtered light from color filter 5, and a table 7 positioned above optical diffusion box 6, for supporting a negative film carrier 8. Further, again along optical axis OA, an image forming lens 9 is provided above table 7, and a shutter 10 for controlling the passage of light from image forming lens 9 is provided above the lens. In addition, a mirror 11 for reflecting the light passed through shutter 10 along optical axis OA' toward exposing portion 13 is situated at the proper angle above the shutter.

In an actual exposure, the light generated from light source 4 passes through the negative film (hereinafter also referred to as "film") on film carrier 8 and forms image light. Then, the image light passes through image forming lens 9 and reaches printing paper 3 via mirror 11, thus forming an image on the printing paper. In the formation of the image on the printing paper 3 as above, the exposure time depends on the opening time (speed) of shutter 10.

As shown in FIG. 2, a negative film carrier 8 of the photo printing apparatus, film 20 is transferred screen-by-screen in a predetermined direction through a film path 22 so that the image of the film is reflected onto printing paper 3. A DX code portion 40 and a frame number code portion 42 are respectively formed in the side margins of film 20. Here, frame number code portion 42 includes bar-code data for marking each screen in numerical sequence.

FIG. 3 illustrates the DX code portion 40 of negative film 20 in more detail. DX code portion 40 is comprised of inner and outer bar-code portions for DX code timing marks 45 and DX code date 44, respectively. Here, the DX code data indicates the film's manufacturer, type, etc. A perforation 48 along the inner bar-code portion of film 20 is formed with a predetermined spacing throughout the length of the film. Frame number code 42 is comprised of a bar-code indicative of the number accorded to each screen of film 20.

Installed in negative film carrier 8 are a sensor for the DX code portion 40 and a sensor for the frame number code portion 42, which are respectively disposed on either side of film path 22. The DX code sensor comprises separate sensors for respectively detecting DX code data 44 and DX code timing marks 45 and performs a proper exposure and development processing based on the signal detected by the sensor for code data 44. Also, the exposure is performed for each screen based on the signal detected by the frame number sensor. The installed sensors each are fixed to a sensor holder for determining its location with respect to the negative film carrier.

As shown in FIG. 3, the overall width W of DX code portion 40 of film 20 is approximately 2.06 mm, with the width W1 for DX code data 44 of DX code portion 40 being in the range of 0.75 to 1.26 mm, which means that the bar-code markings must be confined to an extremely limited space. Meanwhile, as shown in FIG. 2, the film itself has a width of B of 35 mm with a tolerance of +0.0 mm and –0.2 mm. Here, it should be noted that the width C (FIG. 2) of film path 22 is set to a dimension somewhat larger than the width B so that film 20 can be smoothly conveyed.

Due to the above dimension requirements for marking the bar-codes in DX code portion 40 of film 20, the positioning of the DX code sensor, which is fixed to negative film carrier 8, is critical and must be precisely controlled. Otherwise, a crosstalk phenomenon occurs whereby the respectively detected outputs of the sensor for detecting DX code data 44 and the sensor for detecting DX code timing marks 45 coexist in one or both sensor outputs, or the DX code portion 40 is undetectable altogether.

However, according to the conventional negative film carrier, since each sensor is fixed to a sensor holder which determines a sensor location with respect to negative film carrier 8, the location of the sensor holder must be precisely adjusted with respect to film path 22 of the carrier. Also, a re-adjustment is necessary if the sensor is changed and whenever a repair is made to any of the related components, which is cumbersome. Moreover, as described above, since width C of film path 22 is set somewhat larger than width B of film 20, the negative film is allowed to move laterally, to the extent of the difference between width B and width C, which further contributes to the generation of crosstalk.

SUMMARY OF THE INVENTION

Accordingly, it is an object of the present invention to provide a negative film carrier which can restrict the lateral movement of negative film along a film path and determines the location of a sensor for detecting a DX code, in order to resolve poor detection conditions of the sensor.

To accomplish the above object, there is provided a negative film carrier comprising a body formed with a film path for feeding a negative film which has a DX code on at least one side thereof, the negative film carrier further comprising a restriction member for restricting the lateral movement of the negative film along the film path, and in which DX code sensors for detecting the DX code are integrally formed.

Thus, the lateral positioning of negative film is restricted by the restriction member at the restriction member location in the film path, and the DX code of the film is detected by a DX code sensor installed within the restriction member. Accordingly, it is sufficient to control the relative location of the film restriction member and the DX code sensor using a single restriction member by restricting the lateral movement of the film while detecting the DX code, and thus, the precision of the attachment location of the restriction member with respect to the film path is not critical.

BRIEF DESCRIPTION OF THE DRAWINGS

The above objects and other advantages of the present invention will become more apparent by describing in detail a preferred embodiment thereof with reference to the attached drawings, in which.

DETAILED DESCRIPTION OF THE INVENTION

The present invention will be explained in more detail with reference to the attached drawings.

Figure 4:
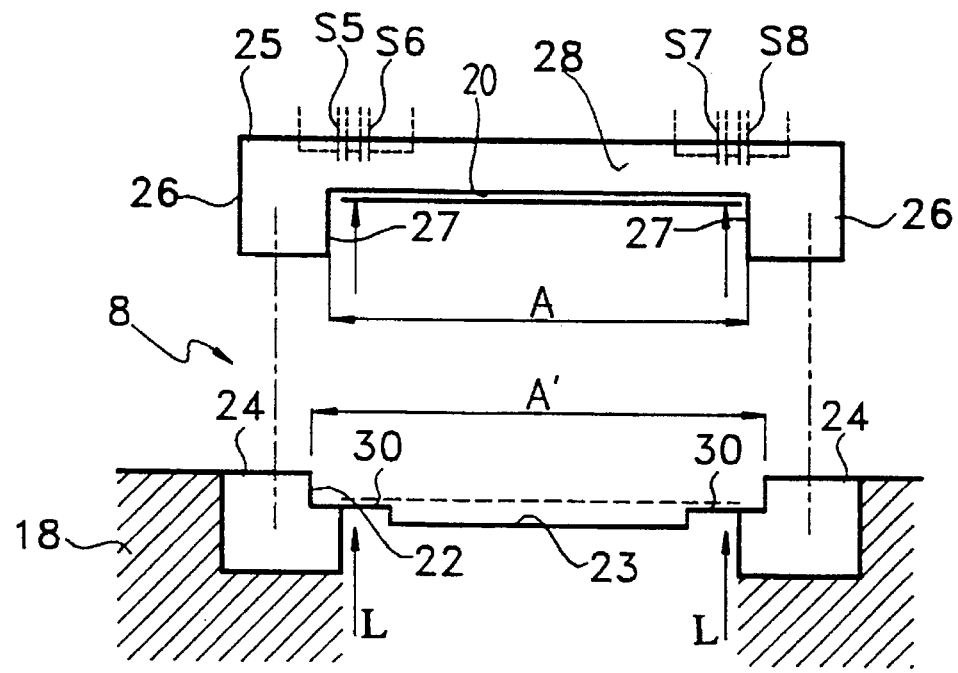
FIG. 4 is an exploded side view of an embodiment of the negative film carrier according to the present invention.
Figure 5:
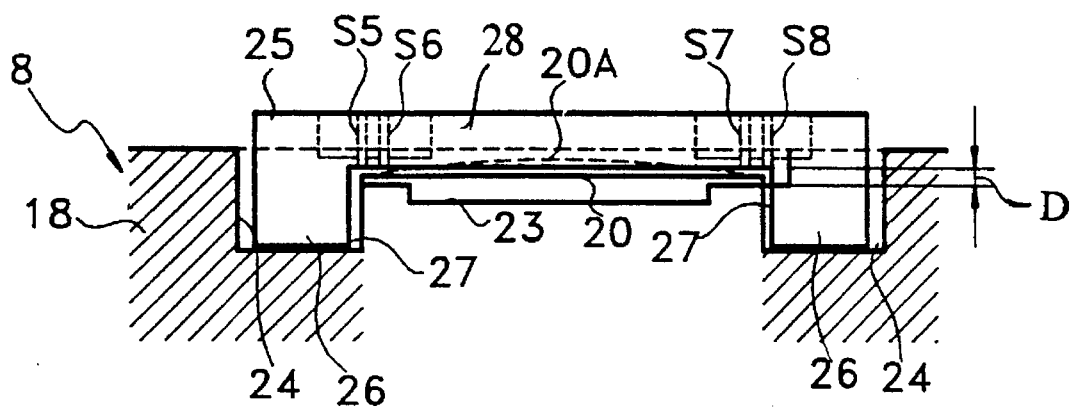
FIG. 5 is a side view showing the embodiment of the negative film carrier according to the present invention.
Figure 6:
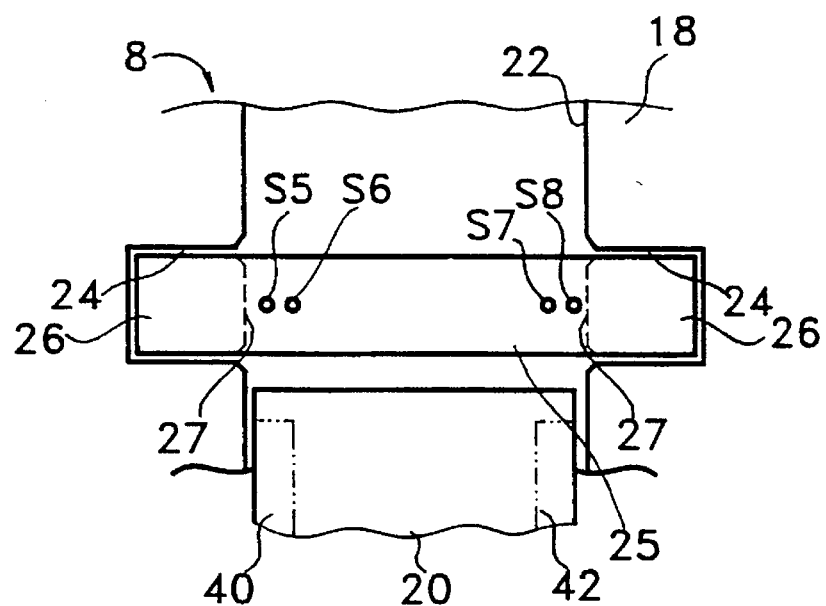
FIG. 6 is a plan view showing the embodiment of the negative film carrier according to the present invention.

Referring to FIGS. 4, 5 and 6, negative film carrier 8 includes film path 22 for conveying film 20, and a restriction member 25 traversing film path 22 is installed across film path 22. Restriction member 25 is made of metal or a similarly resilient material, and includes a ceiling portion 28 where a flat surface is formed by cutting the lower portion of a block material, and a pair of bridge supports 26 having inner walls 27 extending downward from either end of the ceiling portion. Also, sensors S5, S6, S7 and S8 for detecting bar-code dam of the DX code portion 40 and frame number code portion 42 of film 20 are integrally formed into restriction member 25. Sensors S5, S6, S7 and S8 are each composed of a light receiving element facing the film path.

Figure 1:
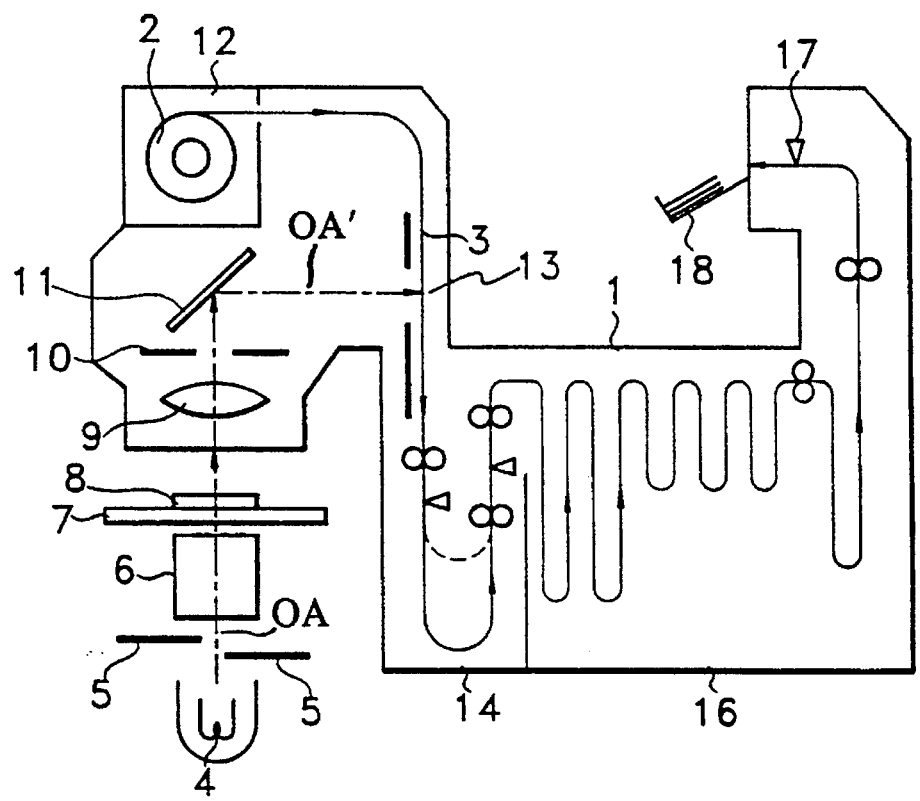
FIG. 1 schematically illustrates an example of a photograph printing apparatus in which a conventional negative film carrier is employed.
Figure 2:
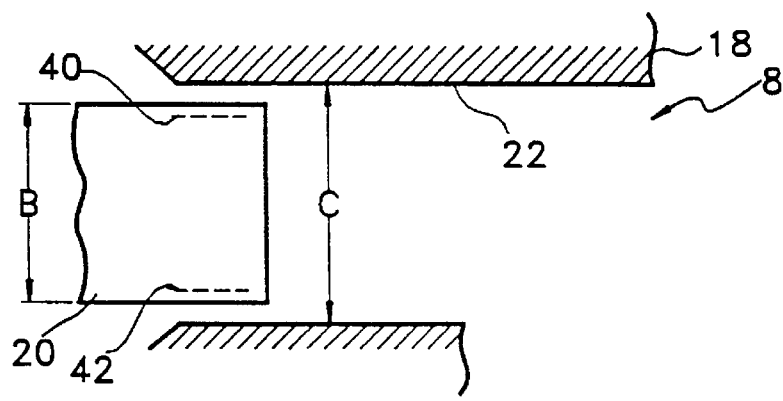
FIG. 2 is a plan view schematically showing an example of a conventional negative film carrier.
Figure 3:
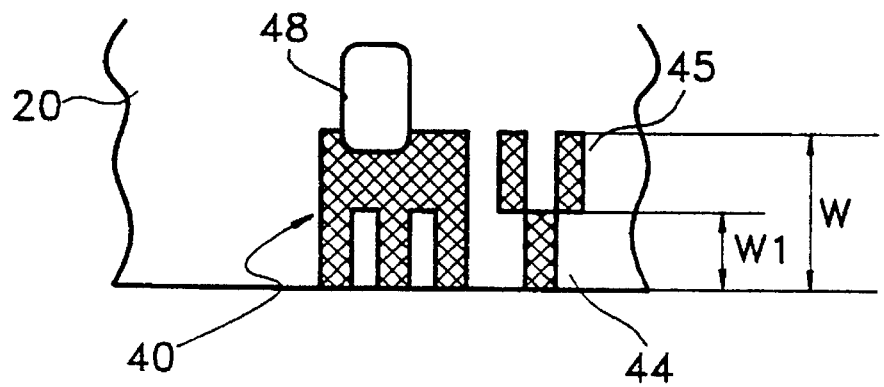
FIG. 3 is an expanded plan view showing the DX code portion of a negative film.

Sensors S5 and S6 constitute a sensor pair and are both installed near one end of restriction member 25, and sensors S7 and S8 constitute another sensor pair installed near the other end of restriction member 25. When film 20 is inserted into the film path for conveying in the normal proceeding direction, sensor S5 is positioned for receiving DX code data 44 and sensor S6 is positioned for reading DX code timing marks 45, while sensors S7 and S8 both face frame number code portion 42. With the film fed into the film path of negative film carrier 8 in the normal direction, film 20 is illuminated from below by illumination light source 4 (FIG. 1), in the direction indicated by the arrows L in FIG. 4.

Receptacles 24 for bridge supports 26 of restriction member 25 are formed, complementary in shape and size to bridge supports 26, adjacent to each edge of film path 22 in a body 18 of negative film carrier 8. As the bottom surface of film path 22, formed in the upper surface of the film carrier body 18, a shallow groove 23 having a planar bottom surface is formed along the length of film path 22. A pair of film guiding surfaces 30 are provided as rails along each side of shallow groove 23, which oppose the sensors installed in the restriction member 25. Thus, film guiding surfaces 30 prevent the frame image portion of film 20 from being marred or scratched, by allowing the perforations 48 of film 20 to contact the film guiding surfaces as film 20 is conveyed, while the frame image portion travels above shallow groove 23 by a small gap. Restriction member 25 lies directly across film path 22 and is fixed by inserting bridge supports 26 of restriction member 25 into complementary receptacles 24. With restriction member 25 thus fixed, a relatively small space (approximately 0.4 mm, marked as D in FIG. 5) and a tunnel whose width is restricted by inner walls 27 are formed between ceiling portion 28 of restriction member 25 and bottom surface (shallow groove) 23 of film path 22. Thus, film 20 is conveyed along film path 22 through the tunnel.

As shown in FIG. 4, a space A between inner walls 27 of restriction member 25 is smaller than the width A' of film path 22 and is tightly controlled such that it (space A) is approximately equal to or slightly smaller than the width of film 20. Accordingly, as shown by the curved, dotted line 20A in FIG. 5, when film 20 is conveyed via film path 22, any crowning of film 20 which may occur is restricted by passing through the tunnel having the narrow height D. At the same time, lateral positioning is restricted by inner walls 27. In addition, as the film passes through the tunnel, sensor S5 detects DX code data 44 and sensor S6 detects DX code timing marks 45 of negative film 20, while sensors S7 and S8 detect frame number code 42.

Thus, the lateral movement of negative film 20 conveyed through film path 22 is restricted by inner walls 27 of restriction member 25. At the same time, DX code sensors S5 and S6 which are installed within restriction member 25 detect DX code data 44 and DX code timing marks 45, respectively. Therefore, sensors S5 and S6 precisely detect DX code data 44 and DX code timing mark 45 of negative film 20, since the film's lateral deviation with respect to DX code sensors S5 and S6 is restricted. Thus, crosstalk between signals detected by sensors S5 and S6 is not generated, and DX code data 44 and DX code timing marks 45 can be precisely detected.

In addition, if film 20 is inserted in the reverse direction, sensors S5 and S6 detect the information of frame number code portion 42 of film 20 in the reverse direction, sensor S7 detects DX code timing marks 45 in the reverse direction, and sensor S8 detects DX code data 44 in the reverse direction. From the detected output of each sensor, it is recognized that film 20 is being fed in a reverse fashion. However, since a printing and a development process can be performed without any problem even if film 20 is inserted in the above manner, the printer for use in a photograph printing can perform normally.

Where film 20 is inserted upside down, sensors S5 ad S6 detect the information of frame number code portion 42 of film 20 in the normal direction, sensor S7 detected DX code timing marks 45 in the normal direction, and sensor S8 detected DX code data 44 in the normal direction. From the detected output of each sensor, it can be recognized that film 20 is being fed upside down. Therefore, the user is warned of an alarm condition and can reverse the rotation of transferring rollers (not shown) in order to convey film 20 in the reverse direction to unload film 20 so that the film may be inserted again correctly.

Another problem situation can occur where film 20 is inserted into the film path in the reverse direction as well as upside down. In this case, sensor S5 detects DX code data 44 in the reverse direction, sensor S6 detects DX code timing marks 45 in the reverse direction, and sensors S7 and S8 detect the frame number code 42 in the reverse direction. From the detected output of each sensor, it is recognized that film 20 is being fed both in a reverse fashion as well as upside down. Then, via the same means as described in the above case, film 20 may be removed and reinserted correctly.

According to the present invention, the restriction member for restricting the lateral movement of a negative film is installed in a film path, and a DX code sensor for detecting the DX code of the film is installed in the restriction member. Therefore, the restriction member restricts the overall lateral movement of the film as it is conveyed through the film path as well as tightly controlling the location of the DX code sensor itself. In addition, the DX code data and DX code timing can be precisely detected without crosstalk. Moreover, since the restriction member itself performs the lateral restriction of the film and the location restriction of the DX code sensor, the data and timing information can be precisely detected without crosstalk even though the precision of the location of the restriction member as attached, relative to the film path, may be poor. Further, the film can be conveyed smoothly since the width of the film path can be set wider than that of the film.

What is claimed is:

1. A negative film carrier comprising a body formed with a film path for feeding a negative film which has a DX code formed on at least on side thereof, said negative film carrier further comprising:

a restriction member for restricting the lateral movement of the negative film along said film path, said restriction member having a ceiling portion located above an upper portion of the film path formed in the body of said carrier, and a pair of bridge supports extending downward from either side of the ceiling portion and installed on both sides of the film path, the width between the two bridge supports being the same as or narrower than that of said film; and, DX code sensors for detecting the DX code integrally formed in said restriction member.

2. A negative film carrier according to claim 1, wherein film guiding surfaces are formed on both sides of the film path, facing said ceiling portion, and a shallow groove having a predetermined width is formed between the film guiding surfaces.

3. A negative film carrier according to claim 2, wherein the width of said shallow groove is wider than that of a frame image portion of the negative film.

4. A negative film carrier according to claim 2, wherein said sensors are housed on both sides of the ceiling portion facing the film guiding surface.

5. A negative film carrier according to claim 1, wherein receptacles for receiving said bridge supports are formed on both sides of the film path of said body of said negative film carrier.

6. A negative film carrier according to claim 1, wherein said sensors are housed on both sides of the ceiling portion facing the film guiding surface.

* * * * *